United States Patent [19]

McCabria

[11] Patent Number: 4,691,119

[45] Date of Patent: Sep. 1, 1987

[54] PERMANENT MAGNET ALTERNATOR POWER GENERATION SYSTEM

[75] Inventor: Jack L. McCabria, Lima, Ohio

[73] Assignee: Westinghouse Electric Corp., Pittsburgh, Pa.

[21] Appl. No.: 746,819

[22] Filed: Jun. 20, 1985

[51] Int. Cl.$^4$ ............................................. H02K 7/10
[52] U.S. Cl. ..................................... 307/84; 310/112; 322/52; 290/4 C
[58] Field of Search ................. 307/84; 310/112, 113, 310/114, 115, 116, 120, 67, 83, 179, 180, 184, 156; 290/1 R, 1 A, 1 B, 1 C, 6, 4 R, 4 A, 4 B, 4 C; 318/149, 157, 652, 620, 491, 540, 539, 538; 322/28, 29, 25, 27, 32, 52, 54, 55, 44

[56] References Cited

U.S. PATENT DOCUMENTS

| | | | |
|---|---|---|---|
| 1,292,592 | 1/1919 | Ferns | 310/112 |
| 1,292,621 | 1/1919 | McCloskey | 310/112 |
| 1,430,712 | 10/1922 | Wood | 310/112 |
| 1,595,550 | 8/1926 | Howard | 310/112 X |
| 1,785,965 | 12/1930 | Major | 307/84 |
| 2,463,349 | 3/1949 | Baner | 310/112 |
| 2,500,730 | 3/1950 | Yonkers | 322/52 X |
| 2,782,328 | 2/1957 | Lindberg | 310/112 |
| 2,784,332 | 3/1957 | Kober | 322/52 X |
| 2,808,556 | 10/1957 | Thomas | 310/112 X |
| 2,841,725 | 7/1958 | Clapham | 322/52 X |
| 2,852,733 | 9/1958 | Sorkin | 310/112 X |
| 3,166,698 | 1/1965 | Moser et al. | 318/595 |
| 3,168,665 | 2/1965 | Holper | 310/112 |
| 3,200,324 | 8/1965 | Wagner | 322/32 |
| 3,562,567 | 2/1971 | Carini | 310/83 |
| 4,274,023 | 6/1981 | Lamprey | 310/83 |
| 4,338,536 | 7/1982 | Hallidy | 318/293 X |
| 4,476,395 | 10/1984 | Cronin | 290/4 C X |

*Primary Examiner*—William M. Shoop, Jr.
*Assistant Examiner*—Shik Luen Paul Ip
*Attorney, Agent, or Firm*—R. P. Lenart

[57] ABSTRACT

An AC power generating system includes an array of permanent magnet alternators. The stator windings of these alternators are electrically connected in series and the total output voltage of the alternator array is regulated by adjusting the relative angular positions of the stators to control the phase angle of the output voltage of each alternator. The alternators employ an inside-out design wherein a plurality of permanent magnets are positioned at circumferentially displaced locations on an internal surface of a nonmagnetic support structure to form the rotor. A stator having a core with longitudinal slots for receiving a stator winding is positioned within the rotor structure such that relative rotation between the stator and rotor induces a voltage in the stator winding.

15 Claims, 9 Drawing Figures

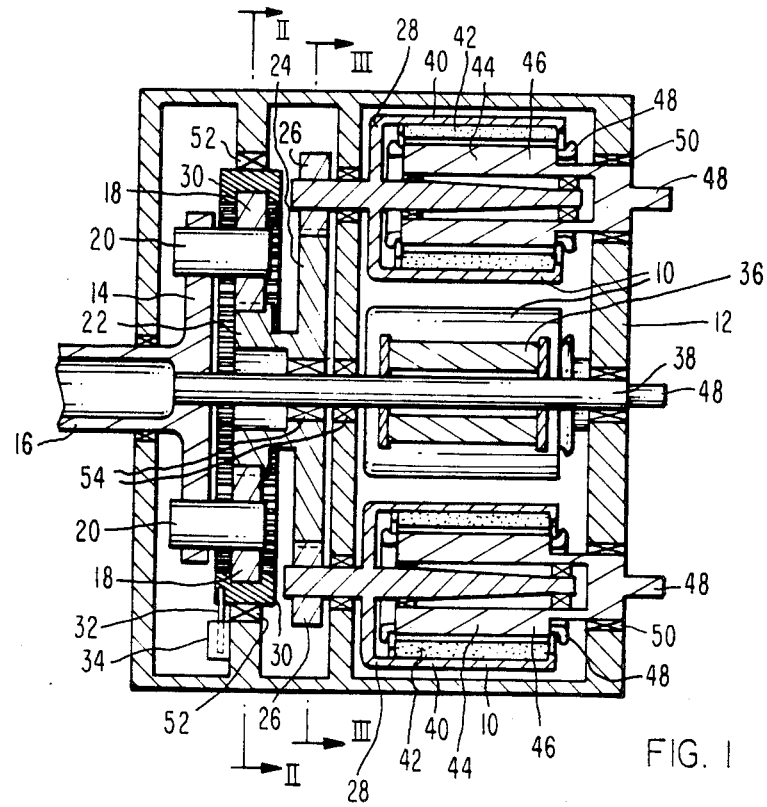
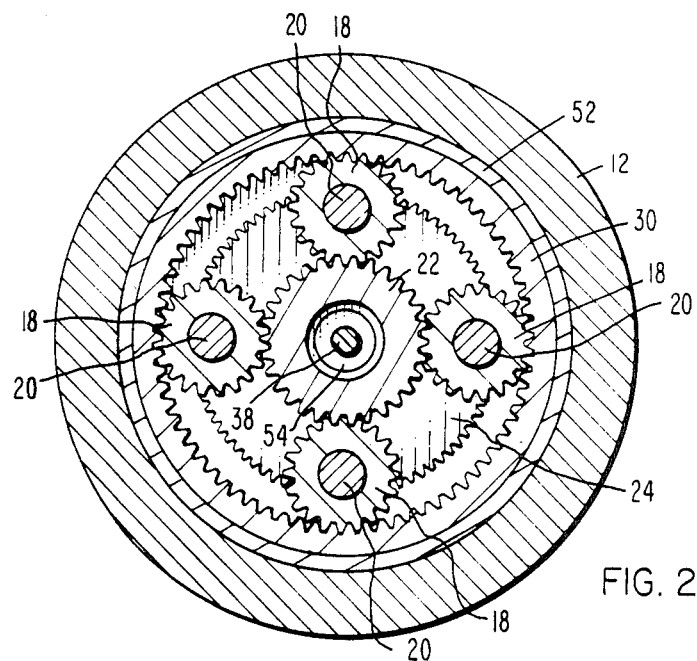

PERMANENT MAGNET ALTERNATOR POWER GENERATION SYSTEM

BACKGROUND OF THE INVENTION

This invention relates to power generating systems and more particularly to such systems which include permanent magnet alternators.

In many applications, there is a need for an efficient power supply with a controllable output frequency. One such application is an airborne power generating system where the prime source of electrical power is a rotating generator that receives its mechanical power input from the engine of the aircraft. Since the engine speed varies, usually over a 2 to 1 range, it is not possible for the generator to produce constant frequency output if coupled directly to the engine. One method of forming a constant frequency output has been to insert a hydraulic constant speed coupling device between the engine and the generator, thereby enabling the generator to operate at a constant speed and hence produce electrical power at a constant frequency. Such a system has several disadvantages, not the least of which is relatively frequent and costly maintenance. These disadvantages can be overcome by an alternative approach in which the generator is directly coupled to the engine, allowing it to produce variable frequency output power as dictated by the engine speed. This variable frequency power is then converted into accurately regulated constant frequency output power by means of a static frequency converter.

One type of system which allows the generator to be coupled directly to the aircraft engine is a DC-link variable speed constant frequency (VSCF) system. In a DC-link converter arrangement, the alternating voltage of the generator is converted into a direct voltage by a rectifier circuit. Then the direct voltage is converted back to alternating voltage, at the desired frequency, by a static power inverter. DC-link VSCF systems usually include synchronous generators which are high speed, spray and conduction oil cooled, three phase output machines. A three phase full-wave rectifier converts the varying frequency (typically 1100 to 2500 Hz) output AC voltage of the generator to a DC voltage. This DC-link voltage is used by the power electronics module to generate a three phase, constant frequency system output voltage. The amplitude of the DC-link voltage is controlled by the magnitude of the field excitation current in the generator. During system operation, the exciter field current is close-loop controlled to maintain the system output voltage within specified limits.

SUMMARY OF THE INVENTION

The present invention provides a permanent magnet alternator system which can serve as an alternative to the synchronous generators currently used in DC-link VSCF power systems. An electrical generating system constructed in accordance with the present invention includes an even number of alternators with each alternator having a rotor and a stator mounted such that rotation of each of the rotors induces a voltage in an associated stator winding. The stator windings of the alternators are electrically connected in series. A means for rotating the rotors of each of the alternators at the same speed is included along with a means for changing the phase angle of the voltage induced in each of the stator windings such that the magnitude of the total voltage across the series connection of the stator windings remains substantially constant as the magnitude of the voltage induced in each of the stator windings changes due to variations in rotor speed.

The output voltage of the alternator array can be used to provide a voltage on a pair of DC-link conductors which are connected to a switch array. The switch array serves to switch voltage from the DC-link conductors to a plurality of output terminals to form an alternating output voltage on the output terminals.

The permanent magnet alternators utilize an inside-out concept wherein rotating permanent magnets are positioned outside of a stationary AC winding. This concept provides features which cannot be provided with conventional permanent magnet alternator rotor containment structures.

BRIEF DESCRIPTION OF THE DRAWINGS

FIG. 1 is a schematic representation of an alternator array drive system constructed in accordance with one embodiment of the present invention;

FIG. 2 is a cross section of the drive system of FIG. 1 taken alone line II—II;

DESCRIPTION OF THE PREFERRED EMBODIMENTS

Figure 3:
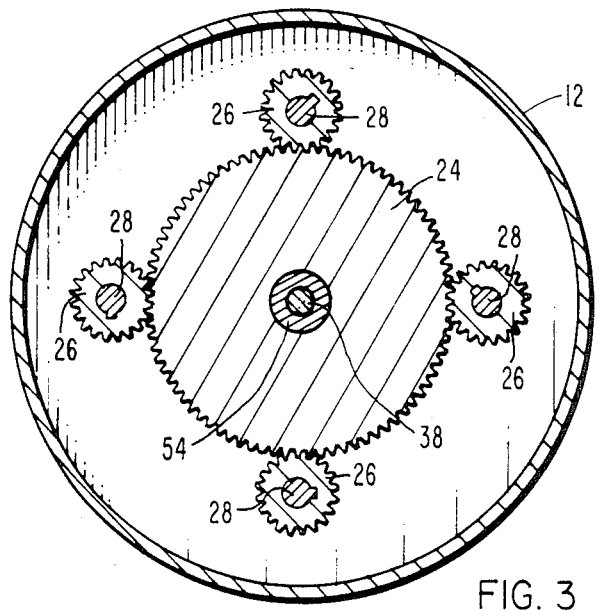
FIG. 3 is a cross section of the drive system of FIG. 1 taken along line III—III.

Referring to the drawings, FIG. 1 is a schematic representation of an electrical generating system constructed in accordance with one embodiment of the present invention. This system includes an even number of alternators 10 mounted in a housing 12 and driven by a speed increasing gear arrangement. An even number of alternators is preferred since voltage regulation can be accomplished by a small angular rotation of one alternator's stator relative to the stator of another alternator. Four or more alternators are preferred since rotation of adjacent stators in opposite directions will produce voltage regulation and a symmetric distribution of loads on the drive gears. The speed increaser includes a carrier 14 attached to a drive shaft 16. A plurality of planet gears 18 are rotatably attached to a plurality of pins 20 at circumferentially displaced locations on the carrier 14. A sun gear 22 is mounted to engage the planet gears 18 and is directly coupled to a larger gear 24 which drives a plurality of pinions 26. These pinions are directly coupled to a plurality of alternator rotors 28. An internal or ring gear 30 also engages the planetary gears 18. Rotation of this internal ring gear is normally prevented by a stop 32 which is controlled by an electric solenoid 34. The combination of this internal ring gear and stop provides a disconnect feature which can be used to disconnect the driving engine and the alternators for protection against electrical faults. Removal of the stop 32 by the action of the solenoid 34 causes the internal ring gear to rotate, thereby preventing rotation of the rotors 28. Thus electric power is not generated when the stop 32 is removed. A pump 36 is connected to a second shaft 38 which is directly coupled to the drive shaft 16. This pump provides circulation of coolant and oil for lubrication. Since the pump is driven by the carrier 14 for the planet gears, oil is circulated even when the alternator rotors are not turning, due to rotation of the ring gear 30.

Each of the alternators includes a nonmagnetic support structure 40 having a generally cylindrical interior surface with a central axis. A plurality of permanent magnets 42 are mounted to extend longitudinally within the nonmagnetic support structure. Each of these magnets includes a circumferentially oriented magnetic axis. Each of the alternator stators 44 includes a core 46 having a plurality of longitudinal slots positioned adjacent to the surface of the core. A plurality of conductors pass through these slots. Relative rotation between the permanent magnets of the rotor and the stator conductors induces a voltage in the conductors. Each of the stators is connected to a control shaft 48 which passes through bearings 50 in the housing 12. This control shaft is used to alter the relative positions of the stator structures, thereby controlling the phase angle of the alternator output voltages. The stator windings of all alternators are electrically connected in series such that control of the stator voltage output phase angle can be used to regulate the magnitude of the output voltage of the series connected array of stator coils.

FIG. 2 is a cross section of the alternator drive system of FIG. 1 taken along line II—II. In this view, a bearing 52 is shown to be positioned between ring gear 30 and the housing 12. This bearing allows the ring gear to rotate when it is desired to disengage the alternators from the input drive shaft.

FIG. 3 is a cross section of the alternator drive system of FIG. 1 taken along line III—III. A bearing 54 is provided so that shaft 38 can rotate, thereby rotating pump 36 in FIG. 1, to circulate oil and coolant even when the alternators are disengaged.

Figure 4:
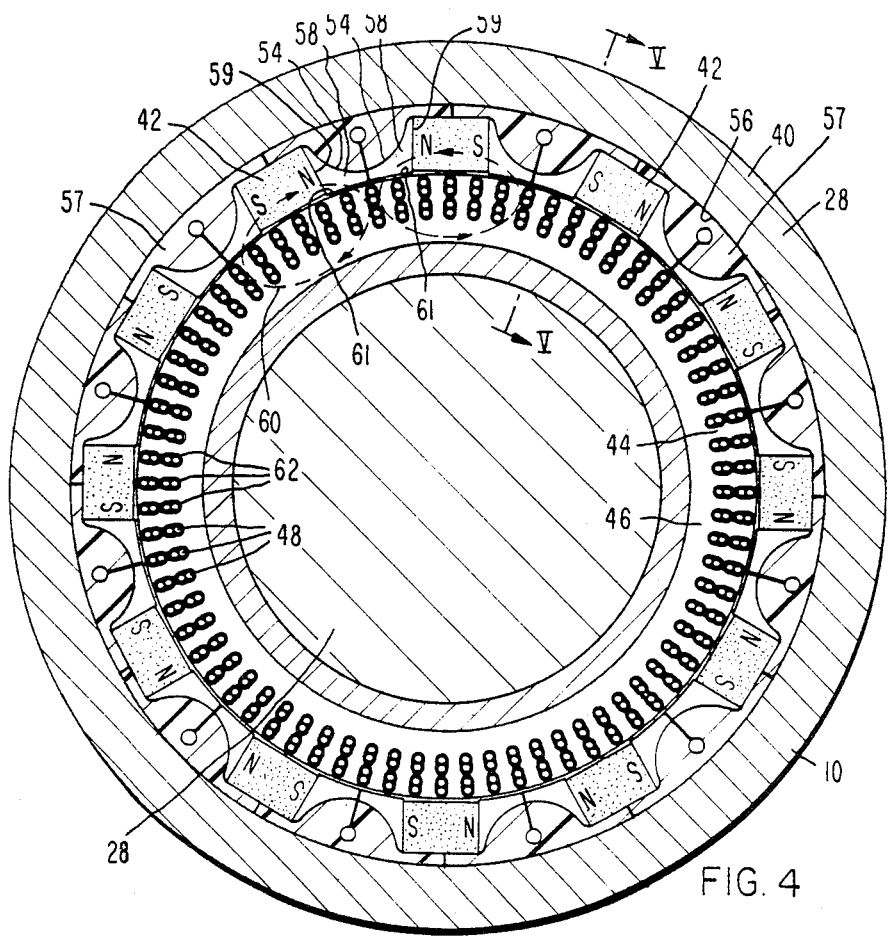
FIG. 4 is a partial cross section of one of the alternators of the system of FIG. 1.

FIG. 4 is a partial cross-sectional view of an alternator 10 which may be used in the drive configuration of FIG. 1. This figure illustrates the inside-out concept wherein the nonmagnetic containment structure 40 of the rotor 28 is formed in a ring composed of, for example, graphite/epoxy composite with the graphite fibers oriented to produce a high modulus of elasticity and high strength in the hoop direction. This containment ring forms a cylindrical internal surface 56 which conforms to an outer cylindrical surface formed by nonmagnetic elements 57. These structures are composed of a non-magnetic, light weight material such as a composite of graphite/epoxy, magnesium of aluminum. A plurality of permanent magnets 42 are positioned adjacent to elements 57 and run longitudinally within the support structure. Each of these magnets includes an axis of magnetization which is generally positioned in a circumferential direction. A low reluctance flux path from the faces of the magnets to the pole heads is provided by a plurality of magnetic steel laminations 58. Each of these laminations includes a first face 59 which lies adjacent to a pole face of one of the permanent magnets, and a second face 61 which forms a portion of a cylindrical surface which encompasses the stator. Each pole head is supplied by two magnets along flux paths 60. The cross section of flux paths 60 within the magnetic steel laminations 58 is reduced by contour 54. This contour causes the volume of the low density material of elements 57 to increase relative to the volume of the dense magnetic steel in laminations 58. Thus the net weight of materials and the net loads imposed upon containment structure 40 are reduced. The stator 44 of the alternator includes a core 46 having a plurality of slots 62 positioned adjacent to the outer surface of the core for receiving a sew through winding 48.

Figure 5:
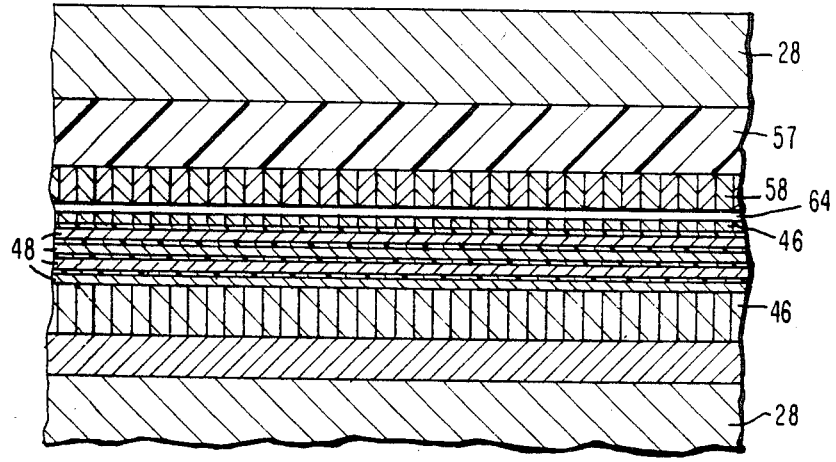
FIG. 5 is a partial longitudinal cross section of the alternator of FIG. 4 taken along line V—V.

FIG. 5 is a partial cross section of the alternator of FIG. 4 taken along line V—V. In this figure, the pole laminations 58 and the steel laminations used in stator 46 are seen to be stacked adjacent to the air gap 64.

Figure 6:
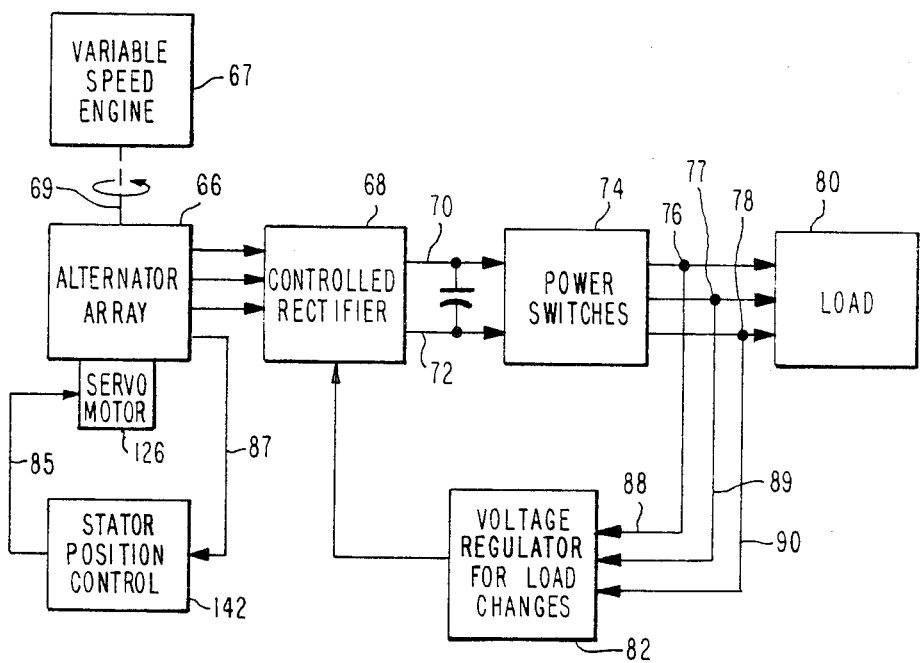
FIG. 6 is a block diagram of a DC-link VSCF power generating system constructed in accordance with this invention.

FIG. 6 is a block diagram of a DC-link variable speed constant frequency power conversion system which includes the alternator array of the present invention. This system includes an alternator array 66, which may be constructed in accordance with FIG. 1. This alternator array is driven by a variable speed engine 67 by way of shaft 69 and feeds an AC output voltage to a controlled rectifier 68 which produces a DC voltage on a pair of DC-link conductors 70 and 72. A plurality of power switches 74 are used to alternately switch voltage from the DC-link conductors to a plurality of output terminals 76, 77 and 78 which are also connected to a load 80. Voltage regulation for changes in the load, is controlled by a rectifier control 82 which monitors the output voltage from the power switches 74 by way of lines 88, 89 and 90, and controls the conduction angle of controlled rectifier 68. In a DC-link VSCF system, it is important that the AC voltage on the rectifier 68 does not exceed a rated limit. Since the magnitude of the output voltage of a permanent magnet alternator increases as the speed of the alternator increases, voltage regulation required by alternator speed changes is accomplished in the present invention by adjusting the relative position of the alternator stators, thereby changing the phase angle of each alternator output voltage so that the total magnitude of the output voltage of the series connected alternators remains constant.

Figure 7:
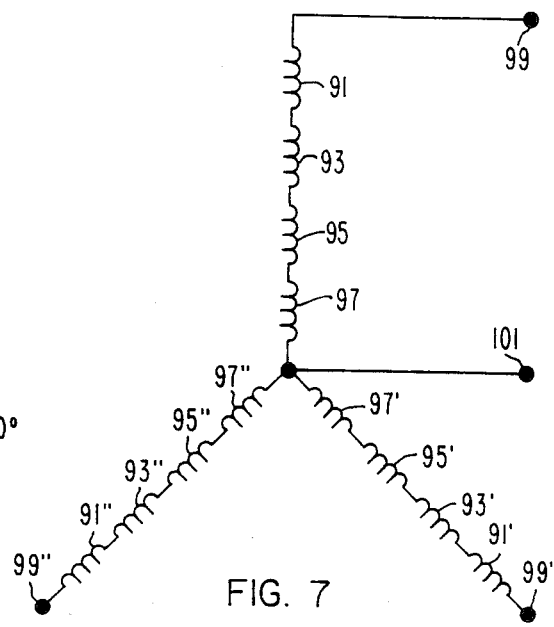
FIG. 7 is a schematic representation of the stator winding connections of the alternator array of FIG. 1.

Voltage regulation of the permanent magnet alternator array, which operates over a wide speed range of for example 2 to 1, is required for proper operation of the DC-link system of FIG. 6. Without voltage regulation, stress on the components within the converter would exceed the voltage rating of available components. The voltage regulation system of the preferred embodiment of the present invention requires an even number of four or more alternators. These alternators are driven by the gear arrangement illustrated in FIGS. 1, 2 and 3. The stator windings for each phase group from each of the alternators are electrically connected in series as shown in FIG. 7, wherein stator windings 91, 93, 95 and 97 for one output phase are electrically connected in series between alternator array output terminals 99 and 101. Corresponding stator windings for two other output phases are illustrated using prime and double prime marks adjacent to related item numbers. Each stator carries load current and produces its share of the total output voltage. In-phase operation occurs at minimum rated operating speed. At this point, the alternators would be designed to produce rated terminal voltage under maximum rated load. A decrease in load current causes the output voltage to rise. Regulation of the output voltage due to a change in the electrical load would be provided by the rectifier control 82 of FIG. 6.

An increase of the rotational speed of the alternators also causes the output voltage to rise. Regulation of the alternator output voltage in this instance would be provided by a relative mechanical rotation of the stators which is produced by servomotor 126 and controlled by stator position control 142 in FIGS. 6 and 9. For example, if the rotation speed of the alternators increases by a factor of 2, the no-load voltage would also increase by a factor of 2.

Figure 8:
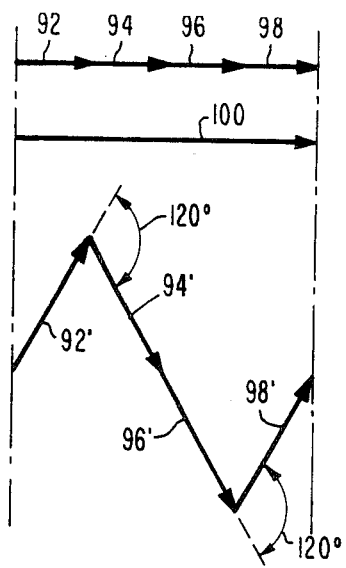
FIG. 8 is a vector diagram which illustrates the output voltage of the alternator array of FIG. 1.

FIG. 8 is a vector diagram which illustrates the method of alternator output voltage regulation used by the present invention. For a four alternator system, vectors 92, 94, 96 and 98 represent the alternator output voltages for one phase at minimum speed. Since the alternator stator windings are connected in series, these voltages add to produce the total output voltage vector 100. The alternator output voltages at maximum speed, for example twice minimum speed, are represented by vectors 92', 94', 96' and 98'. By rotating the stators of adjacent alternators through 120 electrical degrees when the rotors are rotated at maximum speed, the output voltage of the total array remains equal to vector 100. If the alternators have a large number of poles as required for a lightweight mechanism, for example 12, the relative mechanical rotation between the stators becomes 20 degrees for a 2 to 1 speed increase. Thus, the actual rotation of each stator is 10 degrees if adjacent stators are rotated in the opposite direction. Rotation of each of the adjacent stators in opposite directions with an even number of four or more alternators produces a symmetrical distribution of loads on the drive gear 24 in FIG. 3. Table I indicates the required stator rotation to regulate the no-load voltage for a 12 pole alternator as a function of speed ratio.

TABLE I

| Speed Ratio | Required Electrical Rotation in Degrees | Relative Mechanical Rotation in Degrees | Actual Mechanical Rotation in Degrees |
| --- | --- | --- | --- |
| 1.0 | 0 | 0 | 0 |
| 1.25 | 73.7 | 12.29 | 6.14 |
| 1.50 | 96.4 | 16.06 | 8.03 |
| 1.75 | 110.3 | 18.38 | 9.19 |
| 2.00 | 120 | 20.0 | 10.0 |

Figure 9:
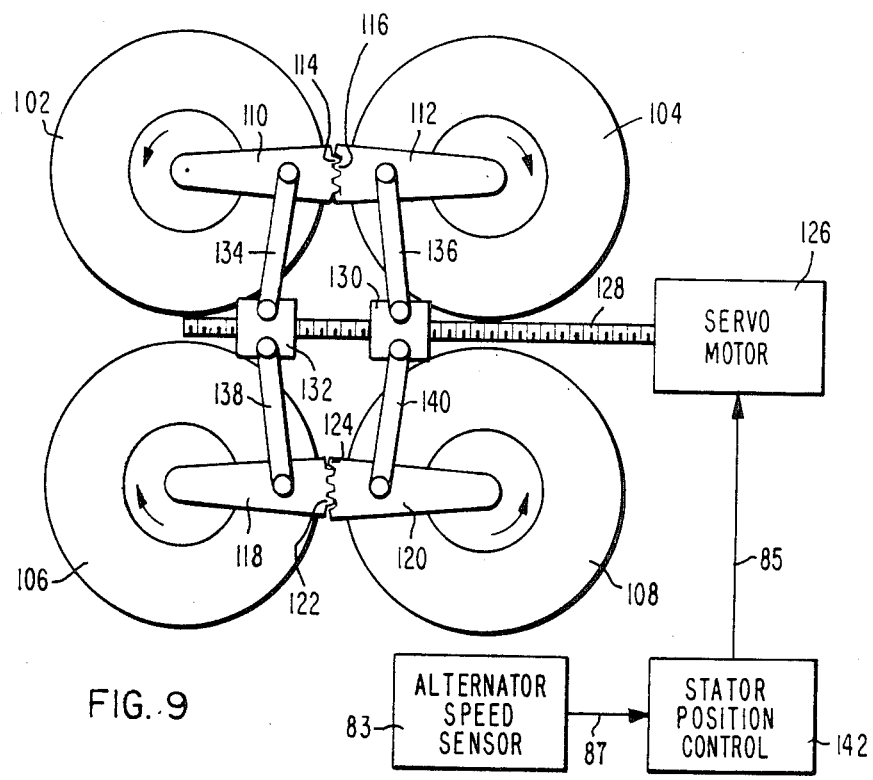
FIG. 9 is a schematic representation of a means for adjusting the output voltage of the alternator array of FIG. 1.

FIG. 9 illustrates the relative direction of rotation for an array of four alternators 102, 104, 106 and 108. Various types of mechanical linkages can be used to rotate the stators. FIG. 9 is a schematic representation of one of these linkages. The stators of alternators 102, 104, 106 and 108 would be supported on gimmal bearings to allow the stators to rotate in their respective frames. The stators of alternators 102 and 104 are linked together through actuating arms 110 and 112 equipped with gear segments 114 and 116 on one end. Similarly, the stators of alternators 106 and 108 are linked together by actuating arms 118 and 120 having gear segments 122 and 124 on their respective ends. Rotation of servomotor 126 turns screw 128 and causes screw blocks 130 and 132 to move together or apart depending on the direction of rotation of the screw rod 128. Links 134, 136, 138 and 140 cause the actuating arms to rotate the attached stators in opposite directions by an equal amount. The servomotor 126 serves as part of the stator position control 142 in FIG. 6. Power to the motor is adjusted in accordance with the alternator speed being monitored by way of speed sensor 83 in FIGS. 6 and 9.

To this point, only regulation of the stator position for speed changes has been considered. However, voltage regulation due to load changes can be accomplished by phase control of the stators if a response time of approximately 100 milliseconds is allowed. In this situation, the input control parameter for the stator position control 142 would be the output voltage of the inverter, the voltage regulator 82 for load changes would be eliminated, and a non-controlled rectifier would be used in place of controlled rectifier 68 in FIG. 6. If only regulation of the voltage due to speed changes is required, the alternator output frequency would be used for the input parameter on control line 87 for the stator position control 142 in FIG. 6.

The preferred embodiment of the present invention has been shown to include a speed increasing gear arrangement which allows an even number of four or more permanent magnet alternators to be disconnected from a drive shaft in case of an electrical fault. This eliminates the possibility of a fire hazard due to permanent excitation in the alternators. The permanent magnet alternators used in the preferred embodiment of this power generating system are constructed of lightweight materials and do not require any welding together of magnetic and nonmagnetic steels. Laminated magnetic steel is used to form the rotor pole heads of these lightweight, low volume alternators. Output voltage regulation for the series connected alternator array is achieved by controlling the relative positions of the alternator stators.

Although the present invention has been described in terms of what is at present believed to be its preferred embodiment, various changes may be made without departing from the scope of the invention. It is therefore intended that the appended claims cover such changes.

What is claimed is:

1. An electrical generating system comprising:
   a plurality of permanent magnet alternators, wherein each of said alternators includes a rotor and a stator mounted such that rotation of each of said rotors induces a voltage in a stator winding in an associated one of said stators, and wherein the stator windings of each of said alternators are electrically connected in series;
   means for rotating the rotors of each of said alternators at the same speed; and
   means for changing the phase angle of the voltage induced in each of said stator windings such that the magnitude of the total voltage across the series connection of said stator windings remains substantially constant as the magnitude of the voltage induced in each of said stator windings changes.

2. An electrical generating system as recited in claim 1, wherein said means for changing the phase angle of the voltage induced in each of said stator windings effectuates the phase angle change by mechanically rotating each of said stators.

3. An electrical generating system as recited in claim 1, wherein said means for rotating the rotors of said alternators includes:
   a carrier attached to a drive shaft, said carrier including a plurality of support shafts spaced in an annular array;
   a planet gear rotatably mounted on each of said support shafts;
   a pinion connected to each of said rotors;
   a sun gear engaging each of said planet gears and engaging each of said pinions;
   a ring gear engaging each of said planet gears; and means for preventing rotation of said ring gear.

4. An electrical generating system as recited in claim 3, further comprising:
a housing encompassing said ring gear, wherein said means for preventing rotation of said rear gear stops the rotation of said ring gear with respect to said housing.

5. An electrical generating system as recited in claim 4, further comprising:
a coolant pump connected to said drive shaft.

6. An electrical generating system as recited in claim 1, wherein each of said rotors includes:
a nonmagnetic support structure having a generally cylindrical interior surface and a central axis;
a plurality of permanent magnets wherein said permanent magnets extend longitudinally within said nonmagnetic support structure and have a circumferentially oriented magnetic axis; and
a plurality of magnetic laminations positioned adjacent to said cylindrical interior surface and stacked in an axial direction such that stacks of said magnetic laminations are interspersed between said permanent magnets, wherein a first face of each of said stacks lies adjacent to a pole face of one of said permanent magnets and a second face of each of said stacks forms a portion of a second generally cylindrical surface.

7. An electrical generating system as recited in claim 6, wherein each of said stators comprises:
a generally cylindrical core having a plurality of longitudinal slots positioned adjacent to the surface of said core, wherein said stator winding includes conductors which pass through said slots.

8. An electrical generating system as recited in claim 7, further comprising:
a plurality of nonmagnetic elements extending longitudinally within said nonmagnetic support structure, between said generally cylindrical interior surface and said magnetic laminations.

9. An electrical generating system as recited in claim 8, wherein said magnetic laminations each include a contoured edge such that the longitudinal cross-sectional area of each of said magnetic laminations decreases in a circumferential direction away from said first face.

10. An electrical generating system as recited in claim 1, wherein each means for changing the phase angle of the voltage induced in each of said stator windings comprises:
a plurality of actuating arms wherein a first end of one of said actuating arms is connected to each of said stators;
a plurality of links each having a first point pivotally connected to one of said actuating arms; and
a drive mechanism pivotally connected to a second point on each of said links, such that movement of said links produces rotation of adjacent ones of said stators in opposite directions.

11. An elemental generating system as recited in claim 1, further comprising:
a pair of DC-link conductors, connected to receive a DC voltage from a rectifier which is connected to the series connection of said stator windings;
a plurality of output terminals; and
means for switching voltage from said DC-link conductors to said output terminals to form an alternating output voltage on said output terminals.

12. An electrical generating system as recited in claim 1, wherein the number of said alternators is an even number.

13. A permanent magnet alternator comprising:
a nonmagnetic support structure having a generally cylindrical interior surface and a central axis;
a plurality of permanent magnets, wherein said permanent magnets extend longitudinally within said nonmagnetic support structure and have a circumferentially oriented magnetic axis;
a plurality of magnetic laminations positioned adjacent to said cylindrical interior surface and stacked in an axial direction such that stacks of said magnetic laminations are interspersed between said permanent magnets, wherein a first face of each of said stacks lies adjacent to a pole face of one of said permanent magnets and a second face of each of said stacks forms a portion of a second generally cylindrical surface; and
a stator including a generally cylindrical core having a plurality of longitudinal slots positioned adjacent to the surface of said core and a plurality of conductors passing through said slots, such that relative rotation between said support structure and said core induces a voltage in said conductors.

14. A permanent magnet alternator as recited in claim 13, further comprising:
a plurality of nonmagnetic elements extending longitudinally within said nonmagnetic support structure, between said generally cylindrical interior surface and said magnetic laminations.

15. A permanent magnet alternator as recited in claim 14, wherein said magnetic laminations each include a contoured edge such that the longitudinal cross-sectional area of each of said magnetic laminations decreases in a circumferential direction away from said first face.

* * * * *